United States Patent [19]

Thomas et al.

[11] Patent Number: 5,549,416

[45] Date of Patent: Aug. 27, 1996

[54] DEVICE FOR JOINING TWO MEMBERS TOGETHER

[75] Inventors: Norman S. Thomas, Northwich; Christopher R. Smith, Tamworth, both of England

[73] Assignee: C.V. Buchan Limited, Cheshire, England

[21] Appl. No.: 333,327

[22] Filed: Nov. 2, 1994

[30] Foreign Application Priority Data

Nov. 2, 1993 [GB] United Kingdom ............... 9322603

[51] Int. Cl.⁶ .................... E21D 11/00; F16B 19/00; F16B 21/00
[52] U.S. Cl. ................... 405/153; 411/339; 411/354
[58] Field of Search ............... 411/338, 339, 411/389, 508, 509, 510, 354; 405/152, 153

[56] References Cited

U.S. PATENT DOCUMENTS

| | | | |
|---|---|---|---|
| 3,238,835 | 3/1966 | Rosenberg | 411/338 |
| 4,477,204 | 10/1984 | Rohde et al. | 405/153 |
| 4,761,860 | 8/1988 | Krauss | 411/339 X |
| 4,830,536 | 5/1989 | Birch et al. | 405/153 |
| 5,035,538 | 7/1991 | Mitchell | 405/153 X |
| 5,346,332 | 9/1994 | Wagner et al. | 405/153 |

*Primary Examiner*—Neill R. Wilson
*Attorney, Agent, or Firm*—Sherman and Shalloway

[57] ABSTRACT

A device for joining two members together such as concrete segments for a tunnel lining ring includes a first sleeve for fitting in one of the members to open at a surface thereof and a second sleeve for fitting in the other member. A connecting pin with external ribbing fits in both sleeves, which have internal ribbing, the ribbing of the connecting pin and/or the ribbing of at least one of said sleeves being of resilient material and extending in a substantially parallel direction at an inclined angle to a longitudinal axis of the connecting pin when it is, in use, inserted in the sleeves. The bore of one sleeve is of greater cross-sectional area in one dimension than the bore in the other sleeve, in which other bore the connecting pin can engage as a tight fit, while being able to engage in the firstmentioned bore and traverse it in said one dimension.

10 Claims, 2 Drawing Sheets

DEVICE FOR JOINING TWO MEMBERS TOGETHER

FIELD OF THE INVENTION

This invention relates to a device for joining two members together.

The members can be concrete segments to form, for example, a tunnel lining ring.

SUMMARY OF THE INVENTION

According to one aspect of the present invention, there is provided a device for joining two members together at facing surfaces, the device comprising a first sleeve for fitting in one of said members to open at its facing surface, a second sleeve for fitting in the other of said members to open at its facing surface, and a connecting pin having a longitudinal axis arranged to fit in both sleeves, said sleeves each having a bore with internal ribbing and said connecting pin having external ribbing, the ribbing of said connecting pin and/or the ribbing of the bore of at least one of said sleeves being of resilient material and extending in a substantially parallel direction at an inclined angle to said longitudinal axis of said connecting pin when the pin is, in use, inserted in the bores, and the bore of said at least one sleeve being of greater cross-sectional area in one dimension than the other bore, in which other bore said connecting pin can engage as a tight fit, whilst being able to engage in said bore of said at least one sleeve and traverse it in said one dimension.

According to another aspect of the present invention there is provided a concrete segment joining system comprising two segment members and a device essentially as just defined for joining the two segment members together.

Each member can be a segment of a circle so that a plurality of segments can be joined together to form a circle. The segments can be made of concrete and can be utilised to form a tunnel lining.

Preferably, the bores in the sleeves are rectangular in cross-section, said bore of said at least one sleeve having an elongated cross-section compared with said other bore.

Preferably, the sleeves themselves are of substantially rectangular cross-section with one of the sleeves being of elongate cross-section compared with the other. In such a case, the member receiving the sleeve with the elongate cross-section is provided with a receiving aperture of similar cross-section. The other member is similarly provided with a receiving aperture of lesser cross-section to receive the other sleeve.

The ribbing of the connecting pin can be in the form of threads, for example buttress threads. Alternatively, the ribbing can be in the form of concentric circles. The ribbing can be fully formed on the pin.

Preferably, the connecting pin and the bores of both sleeves are ribbed and, once one member has been joined to the other, substantially half of the length of the connecting pin lies in one of the sleeves and the remaining portion of the connecting pin engages in the other sleeve. Once thus assembled, if one member is slid across the other member in the direction of elongation of the bore of said at least one sleeve, the ribbing of that sleeve and the connecting pin interact to apply a tensile force across the interface between the two members to provide a concealed, rigid connection.

BRIEF DESCRIPTION OF THE DRAWINGS

For a better understanding of the invention and to show how the same may be carried into effect, reference will now be made, by way of example, to the accompanying drawings, in which.

DESCRIPTION OF PREFERRED EMBODIMENT

Figure 1:
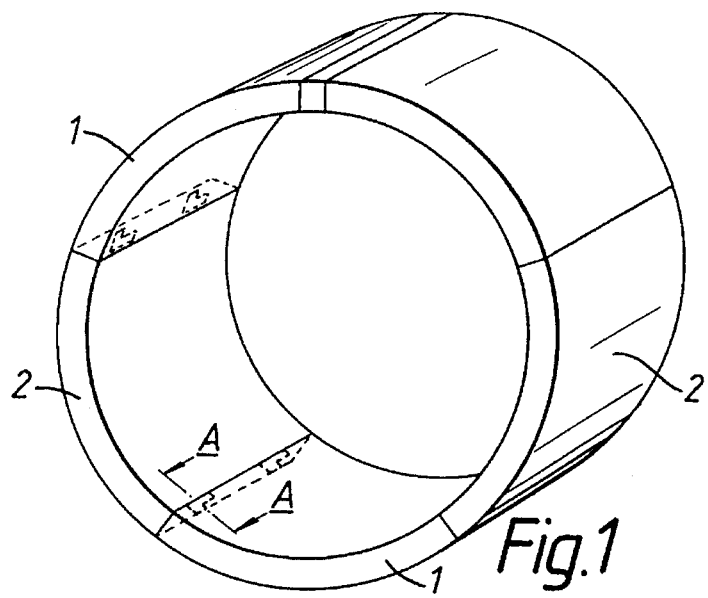
FIG. 1 is a diagrammatic perspective view of a tunnel lining ring comprising a plurality of concrete segments.

The drawings show a device for joining two members together and, in the form illustrated, the members are concrete tunnel lining segments 1, 2 which are joined, as illustrated in FIG. 1, to form a circle. Where the segments 1, 2 are joined together, there are typically two devices according to the invention to perform the joining function at the cross joint between the segments.

Figure 2:
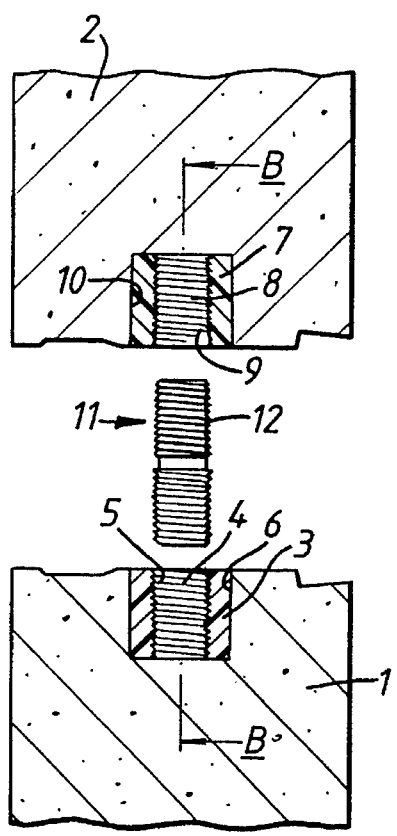
FIG. 2 is a cross-sectional side view based on line A—A in FIG. 1 of two of the segments, prior to joining together, and illustrating a device for joining them together.
Figure 3:
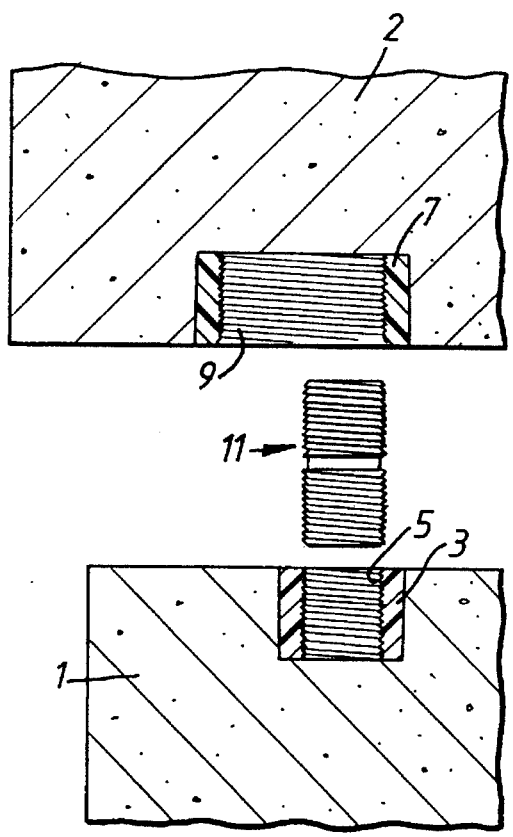
FIG. 3 is a cross-section view of the segments and device shown in FIG. 2, taken on the line B—B in FIG. 2.
Figure 4:
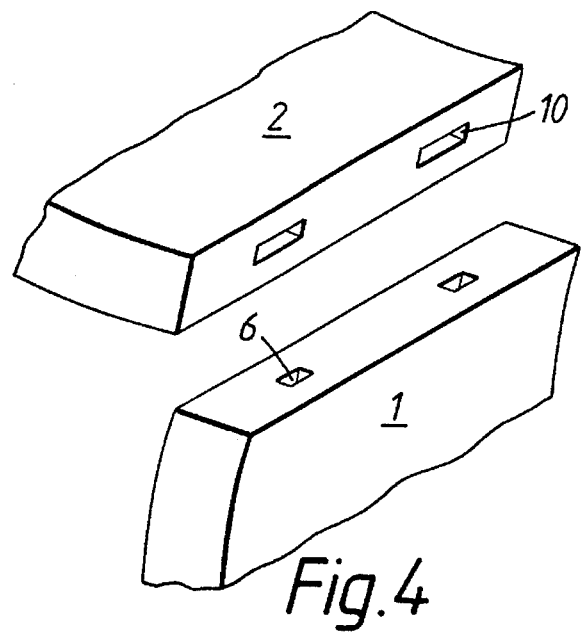
FIG. 4 is a diagrammatic view of the ends of the two segments to illustrate apertures therein to receive two of the devices shown in FIGS. 2 and 3.

As illustrated in FIGS. 2 and 3, the device for joining the segments together includes a first sleeve 3 of resilient material with an internal bore 4 provided with transversely sloping ribbing or a buttress thread 5. The sleeve 3 is fitted in an aperture 6 in the segment 1.

In a similar fashion, the segment 2 is provided with a sleeve 7 of resilient material having an internal bore 8 provided with a transversely sloping ribbing or a thread 9. The sleeve 7 is fitted in an aperture 10 in the segment 2.

Figure 5:
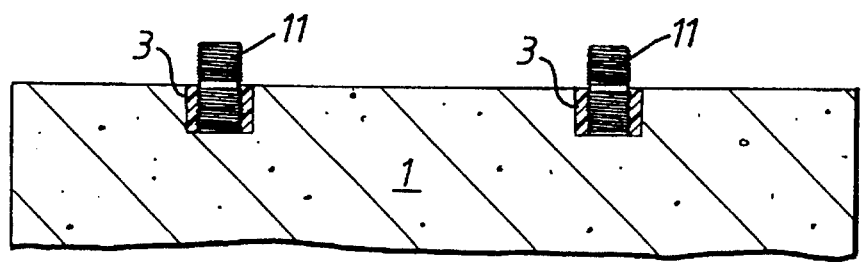
FIG. 5 is a view similar to FIG. 3 but showing the complete width of the two segments and illustrating the method of assembly.

A connecting pin 11 is provided for engagement in both bores 4 and 8. The connecting pin 11 is also provided with a transversely sloping buttress thread 12, the threads 5, 7 and 12 extending substantially parallel to one another as best seen in FIGS. 3 and 5. The threads can be given a slope more than 0° and up to 45° relative to the transverse axes of the sleeves and pin.

As can be gathered from the drawings, the sleeves are of substantially rectangular cross-section, the sleeve 7 and the aperture 10 in which it is mounted having approximately twice the width of the sleeve 3 and the recess 6 in which it is mounted. The connecting pin 11 is also given a substantially rectangular cross-section.

Referring to FIG. 5, to join the segment 2 to the segment 1, two of the connecting pins 11 are forced into their respective recesses 6 in the segment 1 for approximately half of the length of each pin. The segment 2 is then placed over the segment 1 in such manner that the exposed ends of the connecting pins 11 are located to one lateral side of the bores 8 in the sleeves 7, respectively, and then the segments 2 are forced onto the protruding connecting pins 11.

Figure 6:
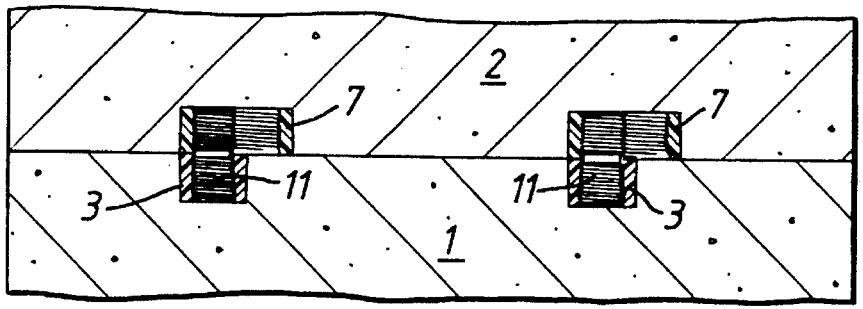
FIG. 6 is a view similar to FIG. 5 and showing the two segments joined together by two such devices.

Finally, referring to FIG. 6, by using for example hydraulic rams in a typical tunnelling shield, the segment 2 is forced sideways to align the segments 1 and 2. Because of the transverse slope of the buttress threads, this sideways movement applies a tensile force across the interface between the segments 1 and 2, thereby providing a concealed, rigid connection between the two segments. This tensile force is achieved by the threads causing the connecting pin and/or the sleeves to stretch.

The threads or ribbing in the sleeves 7 at the entry end, in each case, for the connecting pins can be only partially formed so that the connecting pins 11 are effectively dropped in by the actual weight of the segment 2. The ribbing or threads thus come in, progressing across the sleeves 7 from their entry ends, so that there is a looser fit at their entry ends than at the other ends of the sleeves 7, where the connecting pins 11 are tightened up.

The sleeves and/or connecting pin can be made of a resilient material such as nylon. Glass reinforcement may also be utilised.

We claim:

1. A device for joining two members together at facing surfaces, the device comprising a first sleeve for fitting in one of said members to open at its facing surface, a second sleeve for fitting in the other of said members to open at its facing surface, and a connecting pin having a longitudinal axis arranged to fit in both sleeves, said sleeves each having a bore with internal ribbing and said connecting pin having external ribbing, the ribbing of said connecting pin and/or the ribbing of the bore of at least one of said sleeves being of resilient material and extending in a substantially parallel direction at an inclined angle to said longitudinal axis of said connecting pin when the pin is, in use, inserted in the bores, and the bore of said at least one sleeve being of greater cross-sectional area in one dimension than the other bore, in which other bore said connecting pin can engage as a tight fit, whilst being able to engage in said bore of said at least one sleeve and traverse it in said one dimension.

2. A device according to claim 1, wherein said bores in said sleeves are rectangular in cross-section, said bore of said at least one sleeve having an elongated cross section compared with said other bore.

3. A device according to claim 1, wherein the ribbing of said connecting pin is in the form of threads.

4. A device according to claim 3, wherein said threads are buttress threads.

5. A device according to claim 1, wherein the ribbing of said connecting pin is in the form of concentric circles.

6. A device according to claim 1, wherein both the connecting pin and the bores of both sleeves are ribbed.

7. A device according to claim 1, wherein the ribbing of said one sleeve is only partially formed at the entry end for said connecting pin to provide a looser fit there than at the end of said first sleeve where said connecting pin engages as a tight fit.

8. A concrete segment joining system comprising two segment members and a device for joining the two segment members together, the device comprising a first sleeve for fitting in one of said members to open at its facing surface, a second sleeve for fitting in the other of said members to open at its facing surface, and a connecting pin having a longitudinal axis arranged to fit in both sleeves, said sleeves each having a bore with internal ribbing and said connecting pin having external ribbing, the ribbing of said connecting pin and/or the ribbing of the bore of at least one of said sleeves being of resilient material and extending in a substantially parallel direction at an inclined angle to said longitudinal axis of said connecting pin when the pin is, in use, inserted in the bores, and the bore of said at least one sleeve being of greater cross-sectional area in one dimension than the other bore, in which other bore said connecting pin can engage as a tight fit, whilst being able to engage in said bore of said at least one sleeve and traverse it in said one dimension.

9. A system according to claim 8, wherein each segment member is made of concrete for forming a tunnel lining.

10. A system according to claim 8, wherein each segment is provided with respective apertures for receiving the respective sleeves of the device.

* * * * *